(12) United States Patent
Chung et al.

(10) Patent No.: US 11,446,633 B2
(45) Date of Patent: Sep. 20, 2022

(54) METHOD FOR TREATING POLLUTANTS

(71) Applicant: Well Resources Inc., Edmonton (CA)

(72) Inventors: Warren Chung, Calgary (CA); Xuebing Li, Qingdao (CN); Pei Yu, Qingdao (CN); Mengtao Cui, Qingdao (CN); Quan Shi, Beijing (CN); Zhiming Xu, Beijing (CN); Suoqi Zhao, Beijing (CN); Chunming Xu, Beijing (CN); Keng H. Chung, Edmonton (CA)

(73) Assignee: Well Resources Inc., Edmonton (CA)

( * ) Notice: Subject to any disclaimer, the term of this patent is extended or adjusted under 35 U.S.C. 154(b) by 868 days.

(21) Appl. No.: 16/293,787

(22) Filed: Mar. 6, 2019

(65) Prior Publication Data

US 2020/0269212 A1 Aug. 27, 2020

(30) Foreign Application Priority Data

Feb. 25, 2019 (CN) .......................... 201910136662.4

(51) Int. Cl.
| | |
|---|---|
| *B01J 20/26* | (2006.01) |
| *C02F 1/28* | (2006.01) |
| *C02F 3/34* | (2006.01) |
| *B09C 1/08* | (2006.01) |
| *B01J 20/28* | (2006.01) |
| *B09C 1/10* | (2006.01) |
| *C02F 103/34* | (2006.01) |
| *C02F 101/30* | (2006.01) |
| *C02F 103/00* | (2006.01) |

(52) U.S. Cl.
CPC .......... *B01J 20/26* (2013.01); *B01J 20/2805* (2013.01); *B01J 20/28023* (2013.01); *B09C 1/08* (2013.01); *B09C 1/10* (2013.01); *C02F 1/285* (2013.01); *C02F 3/348* (2013.01); *C02F 2101/30* (2013.01); *C02F 2103/007* (2013.01); *C02F 2103/34* (2013.01)

(58) Field of Classification Search
CPC .. B01J 20/26; B01J 20/28023; B01J 20/2805; B09C 1/08; B09C 1/10; C02F 1/285; C02F 3/348; C02F 2101/30; C02F 2103/007; C02F 2103/34
USPC ........................................................ 435/262
See application file for complete search history.

(56) References Cited

U.S. PATENT DOCUMENTS

| | | |
|---|---|---|
| 7,597,794 B2 | 10/2009 | Zhao et al. |
| 9,925,532 B2 | 3/2018 | Zhao et al. |
| 10,005,715 B2 | 6/2018 | Siddiqui |

OTHER PUBLICATIONS

Bensebaa, F., Kotlyar, L., Pleizier, G., Sparks, B., Deslandes, Y., Chung, K., Surf. Interface Anal., 2000, (30) 207-211.
Chung, K.H., Janke, L.C.G., Dureau, R., Furimsky, E., Environmental Sci. & Eng., Mar. 1996, 50-53.
Chung, K.H. and Xu, C., Fuel, 2001, 80(8), 1165-1177.
Koustas, R., Singhvi, R., Mohn, M., US EPA, Contaminants and Remedial Options at Pesticide Sites, 1994.
Zhao, S., Kotlyar, L.S., Sparks, B.D., Woods, J.R., Gao, J., Chung, K.H., Fuel, 2001, 80(13), 1907-1914.
Zhao, S., Kotlyar, L.S., Woods, J.R., Sparks, B.D., Gao, J., Kung, J., Chung, K.H., Fuel, 2002, 81(6), 737-746.

*Primary Examiner* — Edward M Johnson
(74) *Attorney, Agent, or Firm* — Santosh K. Chari; CPST Intellectual Property (57) ABSTRACT

A method of treating or remediating contaminated material, such as water or soil, comprises contacting such material with asphaltenes. The asphaltenes are preferably produced as a by-product of petroleum refining and, in particular, a by-product of vacuum residua. An adsorbent material comprising such asphaltenes is also provided.

11 Claims, 9 Drawing Sheets

METHOD FOR TREATING POLLUTANTS

CROSS REFERENCE TO PRIOR APPLICATION

The present application claims priority under the Paris Convention to Chinese Patent Application No. 201910136662.4, filed Feb. 25, 2019, the entire contents of which are incorporated herein by reference.

FIELD OF THE DESCRIPTION

The present description relates to the utilization of petroleum asphaltenes in various non-combustible applications. In particular, there is described herein the use of petroleum asphaltenes in the treatment or mitigation of environmental damage caused by contaminants in water and/or soil.

BACKGROUND

Water and Soil Contamination

Contamination of water and soil results in considerable and long-term environmental damage. Such contaminants comprise, for example, pollutants, such as dissolved organic substances, sewage, farm chemicals etc. The treatment of contaminated water and/or soil is usually costly and often inefficient and may in fact lead to further contamination (such as when chemicals are added to address other more harmful chemicals). Various solutions have been provided to address the problem of environmental contamination, which comprise means of treatment and prevention. For example, physical methods, such as filtration, and chemical treatment methods etc. have been proposed to remove or reduce contaminant levels in water and soils. Many of these solutions, while having some degree of effectiveness, have certain drawbacks. One example of the prior solutions is the use of activated carbon, such as in granular form, in the treatment of contaminated water, where the activated carbon serves as an adsorption medium for organic contaminants dissolved in water. Such activated carbon has a large surface area (i.e. 500-2000 $m^2/g$) and is therefore well suited for adsorbing dissolved organics. However, such material is costly and involves an energy intensive process for its production. Thus, while treating environmental damage on one hand, the energy demands for producing activated carbon may lead to at least some environmental damage.

Certain refinery by-products, particularly petroleum coke, have also been used for treating water containing dissolved organics, as exemplified by U.S. Pat. No. 7,638,057. However, as with activated carbon, coke is also produced using costly and highly energy intensive processing equipment. Moreover, petroleum coke may be subject to thermal denaturation, thereby itself posing a contamination risk.

It is known in the art that agricultural lands are highly contaminated with residual farm chemicals, such as herbicides, fungicides, insecticides and pesticides, as well as fertilizers. However, as shown by Koustas et al. [Koustas, R., Singhvi, R., Mohn, M., US EPA, Contaminants and Remedial Options at Pesticide Sites, 1994], traditional soil remediation strategies such as stabilization and solidification, soil washing, thermal desorption, solvent extraction, and bioremediation are typically costly to implement, particularly when large areas of land, and large volumes of soil, must be decontaminated. As a result, most or all of contaminated agricultural lands remain untreated as the cost for treatment is highly prohibitive.

There exists therefore a need for an efficient and cost-effective treatment means for treating contaminated water and/or soil.

Asphaltenes

Petroleum is a complex mixture of millions of hydrocarbon compounds including sulfur and nitrogen heteroatoms and metals containing species. In conventional refinery operations, petroleum feedstock is subjected to atmospheric and vacuum distillation. Distillable petroleum fractions are subsequently treated in various conventional refinery processes to produce transportation fuels such as gasoline, jet fuel, and diesel. The non-distillable vacuum residua (VR), commonly referred to as the bottoms of the barrel, cannot be readily processed due to their inferior properties such as deficient hydrogen content and high contaminant (metals, sulfur, nitrogen, and coke precursors) contents [Chung, K. H. and Xu, C., Fuel, 2001, 80(8), 1165-1177]. In some refineries, VR is blended with a light petroleum fraction and sold as fuel oil for power generation or marine bunker oil. In other refineries, a thermal cracking process, namely coking, is used to convert VR into naphtha, gasoils, and coke. Coker-derived naphtha and gasoils are further processed to produce transportation fuels. By-product coke which contains most of the contaminants in VR, is used as fuel for combustion in power plants, and is frequently used as a solid fuel alternative to coal. In sophisticated refineries, highly capital intensive catalytic hydroprocessing units are used to pretreat VR by removing contaminants and enhancing the feedstock processability prior to further processing. In doing so, a fraction of VR is produced as by-product pitch which contains high amounts of contaminants and is sold as bunker oil. For VR containing lower amounts of contaminants, it can be blended with vacuum gas oil (VGO) and processed in the residua fluid catalytic cracking (RFCC) unit to produce gasoline, diesel, and slurry oil. The by-product slurry oil is a high boiling, unconverted fraction which contains catalyst fines. The slurry oil is subjected to physical separation in which the catalyst fines are concentrated in the heavy slurry oil fraction which is decanted and disposed; the light slurry oil fraction is sold as bunker oil.

With increasingly stringent environment regulations and capping of greenhouse gas emissions, the current means of using refinery by-product streams are diminishing. For example, many coal power plants in developed countries and highly populated regions have been converted to burning natural gas, which reduces the demand for petroleum coke. Some US refineries now give away their petroleum coke for free. In Northern Alberta, Canada, where cokers are used to convert mined oilsands bitumen, petroleum coke is stockpiled. Some developing countries impose high tariffs on importing petroleum coke for environmental reasons, which further diminishes demand for petroleum coke. Recently, the International Maritime Organization (IMO) imposed restrictions on marine fuel oil sulfur content. In 2020, the sulfur content of marine fuel will drop to 0.5% wt from the current 3.5% wt. With current refinery operation, it is not viable to produce 0.5 wt % low sulfur by-product bunker oils.

The selective asphaltene separation process described in U.S. Pat. No. 7,597,794 (the entire contents of which are incorporated herein by reference) provides an improved process for treating VR. This reference describes a simple, inexpensive, and low energy intensity process capable of separating VR into deasphalted oil (DAO) and asphaltenes. The DAO component that is separated from the VR may be processed using known methods, such as the method taught in U.S. Pat. No. 9,925,532 (the entire contents of which are incorporated herein by reference), which describes an optimal use of DAO in conventional refineries. The asphaltenes separated from the VR are generally in the form of solid granules which are safe and easy to handle. Asphaltenes are the heaviest and highest carbon intensity components of petroleum and are not suitable feedstock for refining processes.

Therefore, using asphaltenes as a carbon product in a non-combustible manner would serve as a better way to fully utilize the VR resulting from petroleum refining processes, and to also provide a significant carbon storage option for the petroleum industry.

SUMMARY

In one aspect, there is provided a method of treating contaminated material comprising contacting the material with asphaltenes to adsorb one or more contaminants. Preferably, the material being treated comprises water and/or soil and the asphaltenes are used to treat or remediate such contamination.

In another aspect, there is provided asphaltenes in granular or fiber form that is used to adsorb contaminants, such as organic contaminants, from water and/or soil.

In another aspect, the asphaltenes are combined with microorganisms for biochemically degrading the contaminants.

In another aspect, there is provided an adsorbent material for removing contaminants from contaminated material, wherein the adsorbent material comprises asphaltenes.

BRIEF DESCRIPTION OF DRAWINGS

The features of certain embodiments will become more apparent in the following detailed description in which reference is made to the appended figures wherein.

DETAILED DESCRIPTION

The terms "comprise", "comprises", "comprised" or "comprising" may be used in the present description. As used herein (including the specification and/or the claims), these terms are to be interpreted as specifying the presence of the stated features, integers, steps or components, but not as precluding the presence of one or more other feature, integer, step, component or a group thereof as would be apparent to persons having ordinary skill in the relevant art. Thus, the term "comprising" as used in this specification means "consisting at least in part of. When interpreting statements in this specification that include that term, the features, prefaced by that term in each statement, all need to be present but other features can also be present. Related terms such as "comprise" and "comprised" are to be interpreted in the same manner.

The term "and/or" can mean "and" or "or".

Unless stated otherwise herein, the article "a" when used to identify any element is not intended to constitute a limitation of just one and will, instead, be understood to mean "at least one" or "one or more".

The present description utilizes the unique properties of petroleum asphaltenes, which are solid by-products of the solvent deasphalting process, for the effective treatment of water and soil as well as other similar contaminated materials. Thus, in one aspect, the present description provides a use of asphaltenes for the treatment of contaminated water, soil, other similar material. In a particular aspect, the subject asphaltenes described herein are petroleum asphaltenes, such as those produced by a process described in U.S. Pat. No. 7,597,794 referred to above. The scope of the present description is not limited to the source or production means of the asphaltenes.

While asphaltenes may contain substantial amounts of contaminants (metals, sulfur, nitrogen, and coke precursors) found in petroleum feedstock, they are benign and non-leachable. At elevated temperatures, asphaltenes melt in the form of highly viscous liquid which can be transformed to produce various structured carbon-based products. As noted above, and as known in the art, carbon compounds typically need to be activated in order to adequately function as adsorbents. On the other hand, the asphaltenes described herein can be used in various applications with or without having to be activated. The asphaltene material described herein is particularly effective in water treatment, soil remediation, and agricultural applications.

In one aspect, the asphaltenes described herein may be used as feedstock for manufacturing carbon-based products in various structures and forms, including but not limited to fiber, mat, and filler. As described herein, the asphaltenes are heated to elevated temperatures and the resulting asphaltene melt can be formed in various shaped carbon materials. The heating temperature can be expected to range from about 150° C. to about 270° C. The preferred heating temperature is about 220° C. In addition to the aspects of the description discussed above, other asphaltene-derived products can be manufactured similar to those carbon-products, as is known in the art.

In one broad aspect of the present description, a method of using asphaltenes to treat water containing dissolved organics is provided, comprising of mixing the asphaltenes and water for a sufficient time in an adsorption reactor to allow the asphaltenes to adsorb a substantial portion of dissolved organics from the water. It is understood that the asphaltene materials described herein can be used to treat any water source that has a substantial amount of dissolved organics, which includes but is not limited to industrial process water, sewage water, and farm drainage water.

As discussed above, it is known in the art to use granular activated carbon as an adsorption medium for the treatment of contaminated water, for example. However, as also noted above, the cost of such material makes it prohibitive to use in all applications. On the other hand, although the available surface area of asphaltenes is relatively low in comparison, this material is attractive in view of its relatively low cost and abundancy. Vacuum residua (VR) contain up to about 30 wt % of asphaltenes. The present description therefore offers an economical and environmentally friendly way to treat contaminated water and the like. Also, the present description relies on the utilization of a waste product of the petroleum industry and therefore has environmental benefits.

In one aspect, the asphaltenes described herein may be used to treat process water from petroleum related operations. The asphaltenes are produced during a solvent deasphalting process, where asphaltenes are produced at high enough quantities such that the concentration of the asphaltenes in the resulting asphaltene/water mixture can be expected to be range from about 10% to about 50% by weight.

There is provided herein an adsorption reactor that can be, for example, a stirred tank reactor as known in the art, such as a continuous flow stirred tank reactor. In the alternative, the adsorption reactor can be a plug flow reactor, such as a long pipe of sufficient length to provide proper mixing and residence time.

In one aspect, the asphaltenes described herein may be used for agricultural applications. The present description offers a viable way to decontaminate the soil and remove dissolved organics in farm drainage water.

In one aspect, the asphaltenes described herein may be mixed with contaminated soils to adsorb contaminants, such as farm chemicals etc., contained therein. In this way, the asphaltenes prevent or at least reduce the contaminants from percolating to the ground water system. The asphaltenes described herein can be laid down as entrenchments, which adsorb chemicals from water discharging into the ground water system.

In one aspect, the asphaltenes described herein may be as a soil matrix for agricultural purposes. The asphaltenes may also be used as a substitute for a soil matrix for land reclamation purposes.

As will be understood from the present description, one advantage of using asphaltenes in the presently described manner is that they are a chemically benign natural product. Thus, the unique use of asphaltenes as provided herein serves to mitigate environmental damage by efficiently and cost effectively treating contaminated materials (e.g. water, soil) without causing any deleterious environmental effects.

Figure 1:
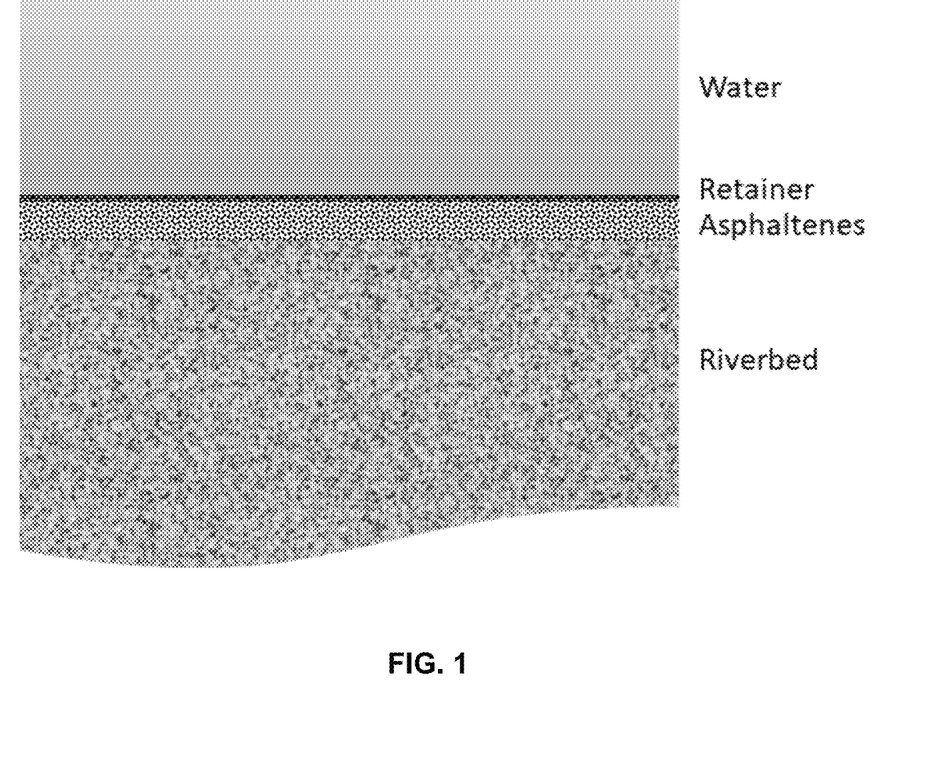
FIG. 1 illustrates a schematic drawing of an embodiment of decontamination of polluted river using asphaltenes.

Thus, in one aspect, the asphaltenes described herein may be used to decontaminate polluted water streams, such as rivers, channels and other waterways. For example, as illustrated in FIG. 1, the asphaltenes described herein may simply be spread over a riverbed, thus offering a simple and cost-effective means of adsorbing contaminants therein. The thickness of the asphaltene layer would vary based on the concentration of the contaminants and the volumetric flow rat of the water. In one aspect, the asphaltene layer may have a thickness from a few centimeters, such as about 5 centimeters, to about 20 centimeters or more. The thickness of the layer may be determined by a person skilled in the art based upon the teaching provided herein.

In another aspect, a retainer or other such means may be used to keep the asphaltenes stationary, that is, prevented from being carried away by the flowing water. The retainer material can itself be manufactured using asphaltenes, such as asphaltene fibers as described herein.

As will be appreciated from the present description and in particular FIG. 1, the asphaltenes, when used in the above-mentioned manner, form a boundary layer or barrier that prevents mixing of flowing water with the riverbed. In the case where the riverbed itself is contaminated, the asphaltenes will adsorb the contaminants which leach out from the riverbed. The asphaltenes will also adsorb contaminants entrained in the polluted flowing water.

In one aspect, the asphaltenes described herein may be used to treat streams and other waterways that are contaminated by animal waste or sewage. In this regard, it is known in the art that animal waste and sewage species (such as feces etc.) can be efficiently and ecologically treated using microorganisms. Such processes are well known. The asphaltenes described herein serve to assist in such biological treatment process by serving as a biofilter medium to which the desired microorganisms are adhered. Such asphaltene biofilter (i.e. asphaltenes combined with microorganisms) may be provided in a bioreactor into which contaminated water and/or soil may added.

The bioreactor mentioned above can comprise any stirred tank reactor as known in the art, including continuous flow stirred tank reactors and the like. In the alternative, the bioreactor can be a plug flow reactor, such as in the form of a pipe of sufficient length to provide proper mixing and residence time between the contaminated material and the asphaltene biofilter. In another alternative, the bioreactor can be an open tank. In the aforementioned bioreactor systems, the reactor outlets may be packed with asphaltene-derived biofilter media which prevents entrainment and carry-over of microorganisms downstream.

Further aspects will now be described in additional detail with reference to the following non-limiting examples. It will be understood that these examples are provided solely for the purpose of illustrating aspects of the present description and are not intended to limit the scope thereof.

EXAMPLES

Example 1: Generation of Asphaltenes

Figure 2:
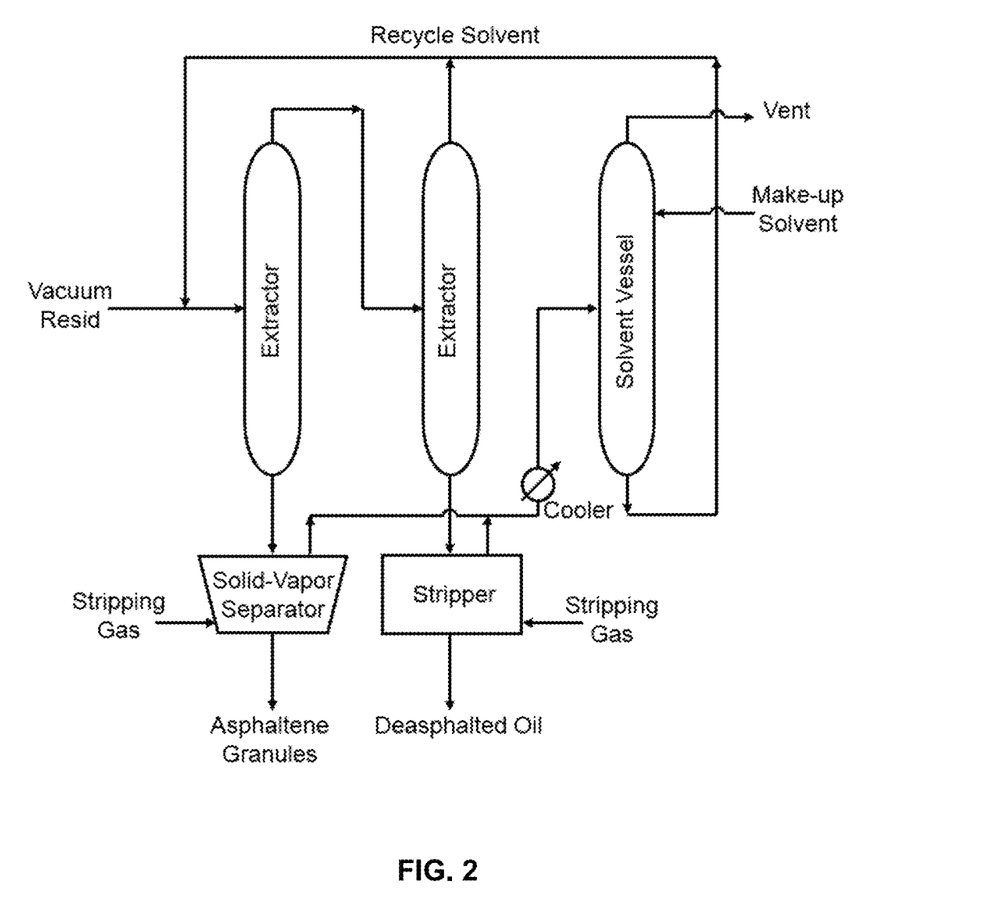
FIG. 2 illustrates a schematic drawing of a solvent deasphalting process that is used to extract solid asphaltenes from vacuum residua (VR).

The present description is based on the results from a series of experimental studies that were designed to determine the chemistry and reactivity of asphaltenes in the form of solid granules, which were obtained from the selective asphaltene separation process described in U.S. Pat. No. 7,597,794 (mentioned above) using mined Athabasca oilsands bitumen-derived vacuum residua (VR) as feedstock. FIG. 2 shows a schematic of the low complexity and low energy intensity solvent-based separation process used to extract solid asphaltenes from VR. The asphaltenes, so obtained, were used for further experimental studies, which are discussed in Examples 2 to 6 below.

Tables 1 and 2 show the proximate and elemental analyses of asphaltenes. The data show that the asphaltenes derived from mined oilsands bitumen VR contained high contents of ash, sulfur, and metals, and was selected as a representative sample to illustrate an extreme case scenario of utilization of petroleum asphaltenes. Comparisons of properties of various petroleum derived VR and asphaltenes were reported by Zhao et al. [Zhao, S., Kotlyar, L. S., Woods, J. R., Sparks, B. D., Gao, J., Kung, J., Chung, K. H., Fuel, 2002, 81(6), 737-746] and Zhao et al. [Zhao, S., Kotlyar, L. S., Sparks, B. D., Woods, J. R., Gao, J., Chung, K. H., Fuel, 2001, 80(13), 1907-1914], respectively. The asphaltenes derived from mined oilsands bitumen VR were used as the test sample in the further experiments discussed in the following examples.

TABLE 1

Proximate analysis of asphaltenes

|  | wt % |
|---|---|
| Moisture | 0.22 |
| Ash | 1.77 |

TABLE 1-continued

Proximate analysis of asphaltenes

| | wt % |
|---|---|
| Volatile Matter | 63.64 |
| Fixed Carbon | 34.37 |

TABLE 2

Elemental analysis of asphaltenes

| | wt % |
|---|---|
| Carbon | 79.2 |
| Hydrogen | 8.0 |
| Nitrogen | 1.05 |
| Sulfur | 6.8 |
| | ppm |
| Nickel | 339 |
| Vanadium | 877 |
| Molybdenum | 52.1 |
| Iron | 1195 |
| Aluminium | 2570 |
| Cobalt | 6.35 |
| Magnesium | 220 |
| Sodium | 323.4 |
| Calcium | 537.6 |
| Titanium | 446 |
| Manganese | 41.3 |
| Cadmium | BDL |
| Chromium | 7.6 |
| Copper | 6.1 |
| Phosphorous | 41 |
| Zinc | 9.059 |
| Silicon | 3660 |
| Lead | BDL |

Example 2: Assessment of Asphaltene Leaching Capability

The asphaltenes as described in Example 1 were subjected to a modified leachability test. The asphaltene granules were sieved using a 150-mesh bio-cell filter to yield asphaltene granules with larger than 100-micron particles for the leachability test. A 5-mL glass burette was filled with 100-micron glass beads up to 2-mL gradual level, followed by 0.25 g of 100-micron asphaltene granules. The first test was carried out using de-ionized water. The burette packed with glass beads and asphaltene granules was filled with 5 mL of de-ionized water and was let soaking for 24 hours. After that, the leachate from the burette was drop-wisely discharged and collected. Another 5 mL of fresh de-ionized water was added to the burette. Similar soaking/leaching procedure was repeated three times, resulting in a total of at least 10 mL of leachate collected. The leachate was subjected to inductively coupled plasma mass spectrometry analysis using Shimadzu ICPMS-2030 to determine the concentrations of regulatory elements specified by Environmental Agency (EPA) and other elements [Chung, K. H., Janke, L. C. G., Dureau, R., Furimsky, E., Environmental Sci. & Eng., March 1996, 50-53]. The leachate was also analyzed for polynuclear aromatics using EPA Method 525.1.

The second test was carried out using pH 4 sulfuric acid solution. Similar control experiments were also carried out in which the burette was filled with glass beads without the asphaltene granules. Table 3 shows the concentrations of regulatory elements specified by EPA's Toxicity Characteristics Leaching Procedure (TCLP) and those of leachates obtained from the leachability tests. The results in Table 3 indicate that the concentrations of all elements in the leachates were much lower than the regulatory levels. Comparing the tests of with and without adding asphaltenes, the concentrations of elements in the leachates were quite similar, indicating that the asphaltenes can be classified as virtually non-leachable. No organic substances were detected in the leachates despite a high sensitivity of the instrument employed.

The new data derived from the leachability tests indicate that most metal species found in solid asphaltenes are tightly bound to the inner structure of the molecule, and are therefore immobile in solution. These findings are in agreement with surface chemistry analyses reported by Bensebaa et al. [Bensebaa, F., Kotlyar, L., Pleizier, G., Sparks, B., Deslandes, Y., Chung, K., Surf. Interface Anal., 2000, (30) 207-211], where surfaces of asphaltenes from oilsands bitumen were found to be composed of more than 90% carbon, while detectable surface metals were dominated by Al, Si, Mn, and Fe. Also, based on the work of Zhao et al. [Zhao, S., Kotlyar, L. S., Sparks, B. D., Woods, J. R., Gao, J., Chung, K. H., Fuel, 2001, 80(13), 1907-1914], asphaltenes from feedstocks of various sources are expected to behave similar to asphaltenes from oilsands bitumen.

TABLE 3

Analysis of leachates with and without adding asphaltenes

| | | De-ionized water | | pH 4 sulfuric acid | |
|---|---|---|---|---|---|
| | Regulatory level ppb | Without asphaltenes ppb | With asphaltenes ppb | Without asphaltenes ppb | With asphaltenes ppb |
| Arsenic | 5,000 | (0.14) | (0.14) | (0.14) | (0.14) |
| Barium | 100,000 | 15 | 20 | 89 | 91 |
| Cadmium | 1,000 | (0.037) | 0.15 | 3.7 | 0.76 |
| Chromium | 5,000 | (0.081) | (0.081) | (0.081) | (0.081) |
| Lead | 5,000 | 0.037 | 0.41 | 22 | 23 |
| Mercury | 200 | 0.38 | 0.36 | 0.56 | 0.72 |
| Selenium | 1,000 | (1.7) | (1.7) | (1.7) | (1.7) |
| Aluminium | | 8.4 | 6.4 | 390 | 1400 |
| Antimony | | 1.5 | 1.6 | 0.71 | 3.7 |
| Beryllium | | (0.042) | (0.042) | 0.057 | 0.057 |
| Bismuth | | 0.35 | 0.25 | 0.92 | 0.28 |
| Boron | | 200 | 190 | 440 | 260 |
| Bromine | | 3.7 | 3.9 | 3.7 | 5.5 |

TABLE 3-continued

Analysis of leachates with and without adding asphaltenes

| | Regulatory level ppb | De-ionized water | | pH 4 sulfuric acid | |
|---|---|---|---|---|---|
| | | Without asphalt-tenes ppb | With asphalt-tenes ppb | Without asphalt-tenes ppb | With asphalt-tenes ppb |
| Caesium | | 0.034 | 0.039 | 0.11 | 0.083 |
| Calcium | | 85 | 120 | 120 | 85 |
| Cerium | | 0.012 | 0.058 | 3.1 | 11 |
| Chlorine | | (11000) | (11000) | (11000) | (11000) |
| Cobolt | | (0.02) | 0.062 | 0.043 | (0.02) |
| Copper | | (1.4) | (1.4) | (1.4) | (1.4) |
| Dysprosium | | (0.017) | (0.017) | 4.4 | 0.41 |
| Erbium | | (0.015) | (0.015) | 0.2 | 0.67 |
| Europium | | (0.012) | (0.012) | 0.18 | 0.17 |
| Gadolinium | | (0.014) | (0.014) | 0.11 | 0.16 |
| Gallium | | (0.088) | 0.11 | 0.11 | (0.088) |
| Germanium | | (0.011) | (0.011) | (0.011) | (0.011) |
| Gold | | (0.006) | (0.006) | 0.0078 | (0.006) |
| Hafnium | | (0.017) | (0.017) | 0.03 | (0.017) |
| Holmium | | (0.0042) | (0.0042) | 0.0092 | 0.022 |
| Iridium | | (0.0047) | (0.0047) | (0.0047) | (0.0047) |
| Indium | | (0.021) | (0.021) | 0.25 | 0.14 |
| Iodine | | 2 | 1.8 | 1 | 1.1 |
| Iron | | (0.38) | (0.38) | (0.38) | (0.38) |
| Lanthanum | | (0.012) | 0.034 | 1.8 | 7.4 |
| Lutetium | | (0.0091) | (0.0091) | (0.0091) | 0.011 |
| Magnesium | | 300 | 450 | 2300 | 4500 |
| Manganese | | (0.14) | (0.14) | (0.14) | (0.14) |
| Neodymium | | (0.026) | (0.026) | 0.36 | 1 |
| Nickel | | (0.03) | 0.32 | 0.67 | (0.03) |
| Niobium | | 0.093 | 0.033 | (0.0075) | (0.0075) |
| Osmium | | (0.0087) | (0.0087) | (0.0087) | (0.0087) |
| Phosphorus | | (21) | (21) | (21) | (21) |
| Platinum | | (0.012) | (0.012) | (0.012) | (0.012) |
| Potassium | | (11) | (11) | (11) | (11) |
| Praseodymium | | (0.0069) | (0.0069) | 0.18 | 0.42 |
| Rubidium | | 0.052 | (0.04) | (0.04) | (0.04) |
| Ruthernium | | (0.015) | (0.015) | (0.015) | (0.015) |
| Samarium | | (0.024) | (0.024) | 0.12 | 0.3 |
| Scandium | | (0.16) | (0.16) | (0.16) | (0.16) |
| Silicon | | (880) | (880) | (880) | (880) |
| Sodium | | 25000 | 22000 | 33000 | 27000 |
| Strontium | | 4.7 | (0.071) | (0.071) | (0.071) |
| Tantalum | | (0.0033) | (0.0033) | (0.0033) | (0.0033) |
| Tellurium | | (0.47) | (0.47) | (0.47) | (0.47) |
| Terbium | | (0.004) | (0.004) | 0.15 | 0.11 |
| Tin | | 0.28 | 0.4 | 0.35 | 0.33 |
| Titanium | | (4) | (4) | (4) | (4) |
| Thallium | | 0.43 | 0.27 | 0.51 | 0.3 |
| Thorium | | 0.0025 | (0.00081) | 0.013 | 0.018 |
| Thulium | | (0.0034) | (0.0034) | (0.0034) | 0.0083 |
| Tungsten | | 5.8 | 1.7 | 8.5 | 2.3 |
| Uranium | | (0.0007) | (0.0007) | 0.014 | 0.023 |
| Vanadium | | (0.04) | (0.04) | (0.04) | (0.04) |
| Ytterbium | | (0.012) | (0.012) | 0.045 | 0.066 |
| Yttrium | | (0.025) | (0.025) | (0.025) | (0.025) |
| Zinc | | 0.092 | 0.54 | 3.3 | 0.24 |
| Zirconium | | 0.034 | (0.023) | (0.023) | (0.023) |

( ) Below Detection Limit

Example 3: Use of Asphaltenes for Water Treatment

In this example, the asphaltenes as discussed above were used as adsorbents for water treatment. The asphaltene granules were sieved using a 150-mesh bio-cell filter to yield asphaltene granules with larger than 100-micron particles for the filtration test. A 5-mL glass burette was filled with 100-micron glass beads up to 2-mL gradual level, followed by 0.25 g of 100-micron asphaltene granules. The test fluids were four drainage water samples obtained from agricultural lands. The burette packed with glass beads and asphaltene granules was filled with 5 mL of drainage water and was let soaking for 24 hours. After that, the filtrate from the burette was drop-wisely discharged and collected. Another 5 mL of drainage water added to the burette. Similar soaking/filtering procedure was repeated five times, resulting in a total of at least 20 mL of filtrate collected. The filtrate was subjected to total organic carbon (TOC) analysis using Shimadzu TOC-L, according to the Chinese standard test method for drinking water quality, GB/T 5749-2006.

Similar control experiments with various drainage waters were also carried out in which the burette was filled with glass beads without the asphaltene granules. Table 4 shows that TOC's in the drainage water filtrates with and without adding asphaltenes. The results in Table 4 indicate that asphaltenes removed TOC in drainage water. The drainage waters with high TOC contents exhibited high percentages of TOC removal. The test results indicate that asphaltenes are good adsorbent for removing organic carbons in water.

TABLE 4

Analysis of total organic carbon (TOC) in various farm drainage water and filtrate samples with and without adding asphaltenes

| Sample | Without asphaltenes TOC, mg/L | With asphaltenes | % Removal |
|---|---|---|---|
| 1 | 32.08 | 12.75 | 60.26 |
| 2 | 22.00 | 12.74 | 42.09 |
| 3 | 16.45 | 11.65 | 29.18 |
| 4 | 10.93 | 10.45 | 4.39 |

As mentioned above, certain refinery by-products, particularly petroleum coke, have been known to be used for treating water containing dissolved organics. This example therefore illustrates that the use of asphaltenes for water treatment is distinctly advantageous as compared to other materials, such as coke.

Example 4: Suitability of Asphaltenes as a Matrix for Plant Growth

Figure 3:
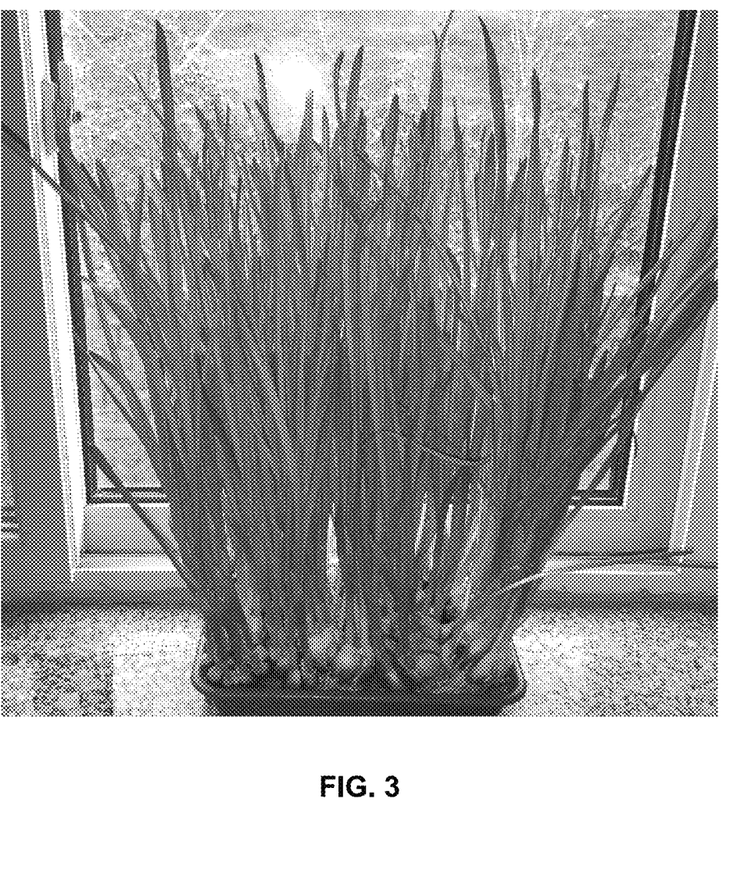
FIG. 3 illustrates plant matter growing in asphaltenes.
Figure 4:
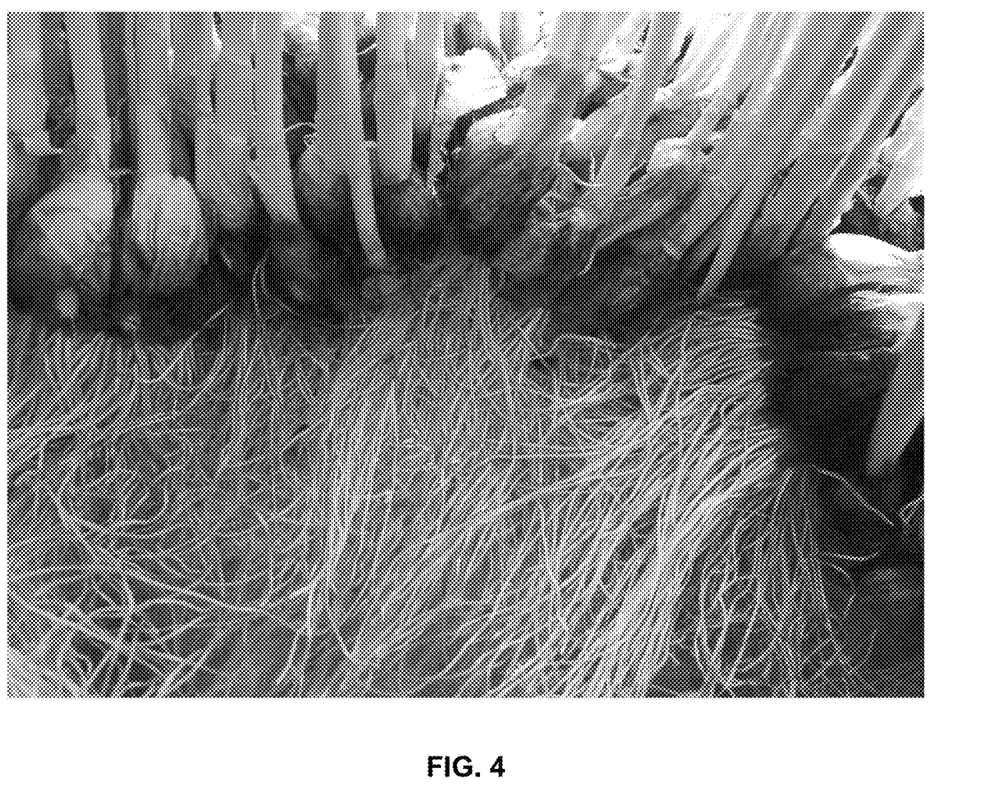
FIG. 4 illustrates roots of plant growing in asphaltenes.

The asphaltenes as described above were used as soil matrix for planting. Asphaltene granules were blended with a soil sample in various compositions (0, 25, 50, 75, and 100 wt % asphaltenes) and used as planting soils. Garlic was the plant arbitrarily selected for this test. The planting was carried out under ambient environment, as shown in FIGS. 3 and 4.

Figure 5:
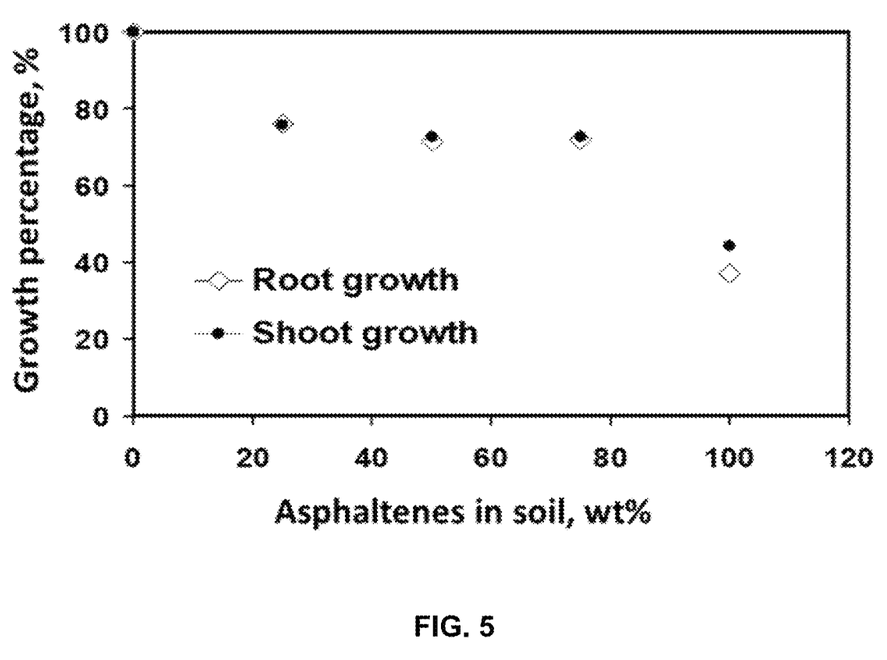
FIG. 5 illustrates the normalized growth percentages of plant roots and shoots as a function of asphaltene content in soil matrix.

After three weeks, the plant growths in various asphaltene-containing soil matrices were determined. FIG. 5 shows the normalized growth percentages of root and shoot as a function of asphaltene content in the soil matrices. The results in FIG. 5 show that the plant growth with asphaltenes alone was 40% of that with soil. However, the plant growths with various asphaltene-soil composition mixtures (25-75 wt % asphaltenes) were relatively constant at 70% compared to that with soil alone. The relative percentage growths of root and shoot were similar.

Example 5: Formation of Asphaltene Fibers

Figure 6:
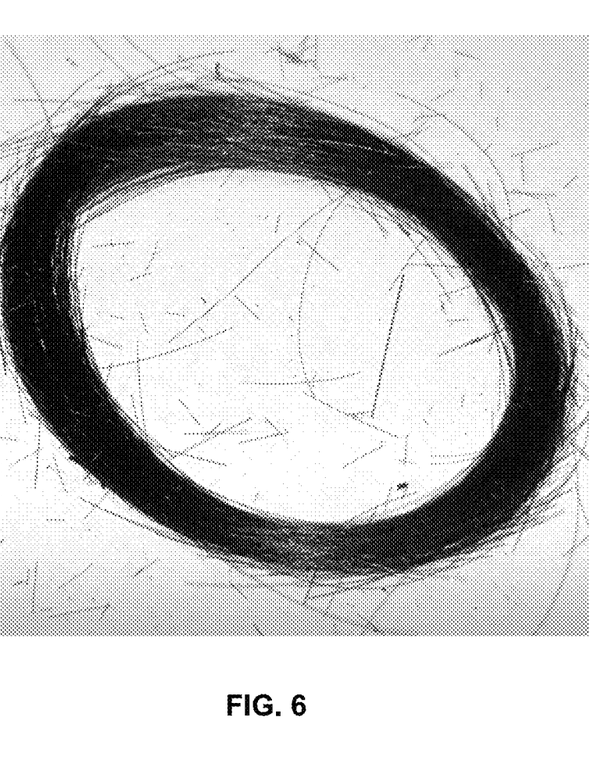
FIG. 6 illustrates asphaltene fiber produced from melt spinning asphaltenes into a continuous filament.

The asphaltenes described above were used as feedstock for producing various fibrous materials. The test was carried out in a single hole laboratory spinneret for melt spinning the asphaltenes which were spun into fine continuous filament, as shown in FIG. 6. The softening temperature was 205° C. The diameters of the asphaltene fibers were about 30 micrometers ($10^{-6}$ m).

Figure 7:
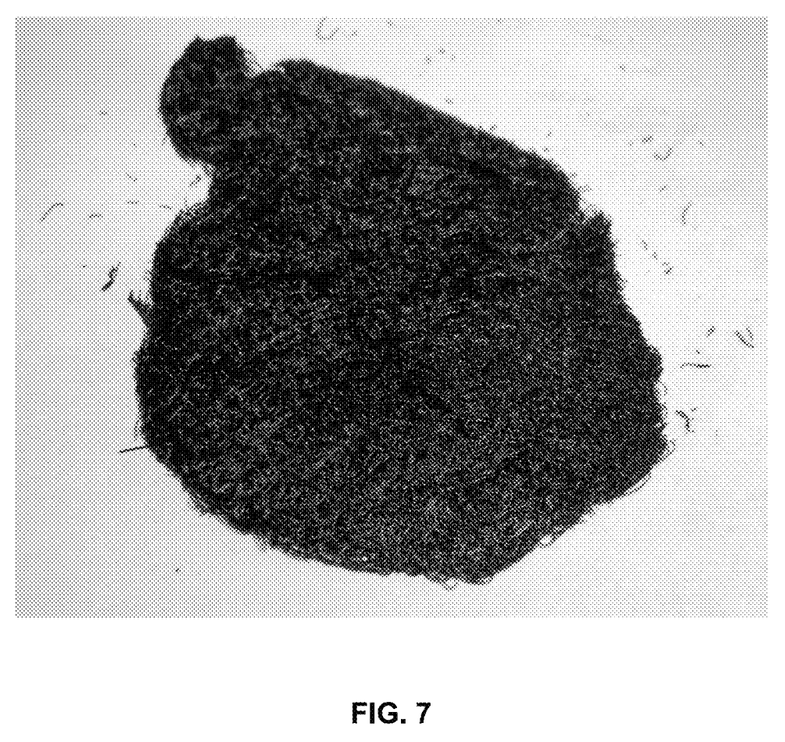
FIG. 7 illustrates an asphaltene mat produced from processing asphaltenes in a centrifugal melt spinning unit.

Another test was carried out in a centrifugal melt spinning unit where the asphaltenes were spun into a tangled mat of non-uniform strand fibers, as shown in FIG. 7.

Figure 8:
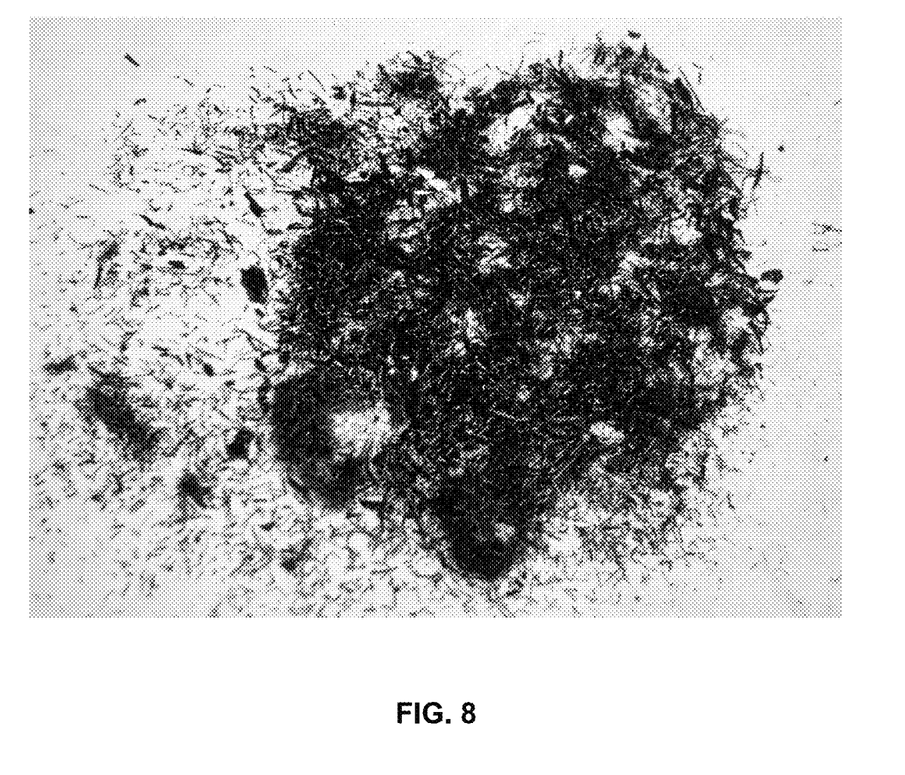
FIG. 8 illustrates asphaltene filler produced from processing asphaltenes in a centrifugal melt spinning unit.

In another test, the centrifugal melt spinning unit was used to produce short asphaltene fibers, as shown in FIG. 8, which can be used as filler (packing material) for various process related applications known to people in the field.

Example 6: Use of Asphaltene Fibers as a Biofilter

Figure 9:
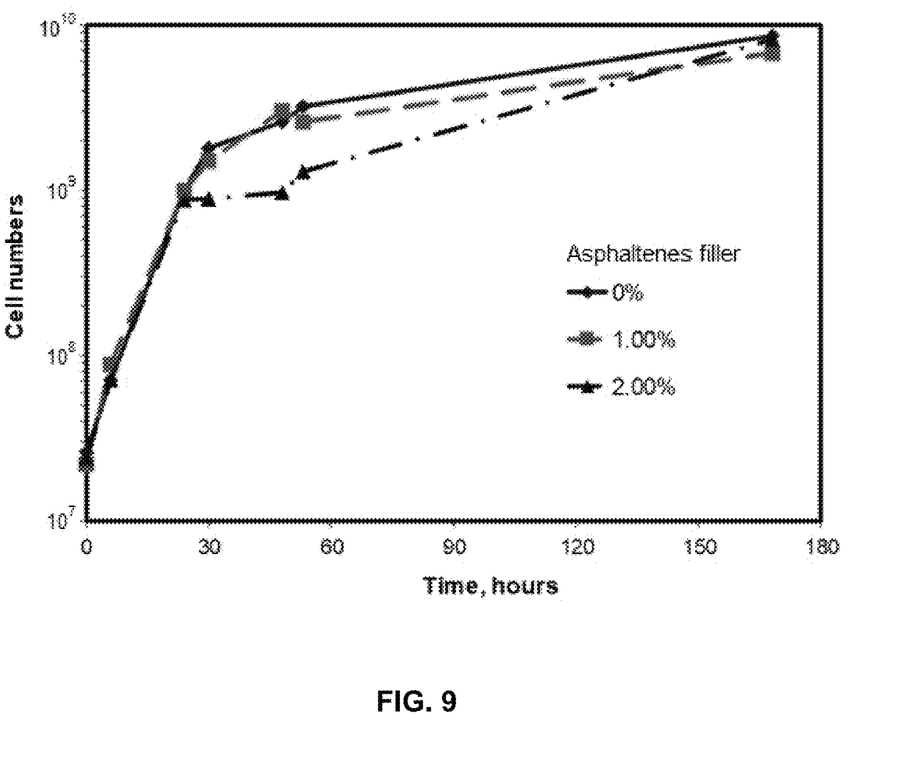
FIG. 9 illustrates bacterial growth rate over time in the presence of asphaltene filler.

The asphaltene filler as described in Example 5 was used as biofilter media. An experiment was set up whereby the growth of a culture of *Thiobacillus* thioparus was monitored in the presence of asphaltene filler with a nutrient solution. Fresh S6 nutrient medium was divided into 90 mL aliquots in 125 mL flasks. Asphaltene filler was added to the flasks to total 1% and 2%. For example, 1 g of the asphaltene filler was added to the solution to represent the 2% sample. A control was also used which contained no asphaltene filler. Finally, the solution was inoculated with 10 mL of a 5-day old culture of *Thiobacillus* thioparus. Flasks were stored on a shaker at 120 rpm and incubated at 28° C. A small amount of solution was removed after 0, 6, 24, 30, 48, 53 and 168 hours for direct cell count measurements. Each test was carried out in duplicate. FIG. 6 shows the growth of *Thiobacillus* thioparus as a function of time in the presence of various amounts of asphaltene filler. The results in FIG. 9 show that asphaltene filler had no significant impact on the *Thiobacillus* thioparus cell counts. Slightly lower cell counts in the presence of asphaltene filler could be due to some cells not existing in extractable solution but instead affixed to the surface of the filler. The test results indicate that asphaltene filler does not inhibit the growth rate of the bacteria.

Thus, this example illustrates that the asphaltenes described herein can be used to retain microorganisms and that such asphaltene-microorganism complex can be used as a biofilter in the treatment of water, soil and or other materials to cause decomposition of contaminants contained therein.

Although the above description includes reference to certain specific embodiments, various modifications thereof will be apparent to those skilled in the art. Any examples provided herein are included solely for the purpose of illustration and are not intended to be limiting in any way. Any drawings provided herein are solely for the purpose of illustrating various aspects of the description and are not intended to be drawn to scale or to be limiting in any way. The scope of the claims appended hereto should not be limited by the preferred embodiments set forth in the above description, but should be given the broadest interpretation consistent with the present specification as a whole. The disclosures of all prior art recited herein are incorporated herein by reference in their entirety.

The invention claimed is:

1. A method of treating contaminated material containing organic contaminants comprising contacting the contaminated material with asphaltenes to adsorb one or more organic contaminants; and
   wherein the asphaltenes are raw petroleum asphaltenes obtained from vacuum residua of a petroleum refining process.

2. The method of claim 1, wherein the contaminated material comprises a liquid and/or solid.

3. The method of claim 1, wherein the contaminated material comprises water.

4. The method of claim 3, wherein the water comprises waste water from an industrial process.

5. The method of claim 3, wherein the water comprises a waterway.

6. The method of claim 5, wherein the asphaltenes are provided on the waterway bed.

7. The method of claim 6, wherein the asphaltenes are immobilized by a retainer.

8. The method of claim 1, wherein the asphaltenes are combined with soil.

9. The method of claim 1, wherein the asphaltenes are in the form of granules or fibers.

10. The method of claim 1, wherein the asphaltenes are in the form of fibers and wherein the fibers are formed into a mat or a packing.

11. The method of claim 1, wherein the asphaltenes are combined with one or more cultures of microorganisms, and wherein the microorganisms have the ability to degrade the organic contaminants.

\* \* \* \* \*